US012723813B2

(12) United States Patent
Fróis et al.

(10) Patent No.: US 12,723,813 B2
(45) Date of Patent: Sep. 1, 2026

(54) SYSTEM AND METHOD FOR DISTRIBUTING LOADS IN A METAL FURNACE

(71) Applicant: Tecnored Desenvolvimento Tecnologico S.A., Pindamonhangaba (BR)

(72) Inventors: Fabrício Tinôco Fróis, Pindamonhangaba (BR); Luciano Augusto Morais Maia, Pindamonhangaba (BR); Sandro Lopes Alberto, São José dos Campos (BR); Ronald Lopes De Oliveira, Pindamonhangaba (BR)

(73) Assignee: TECNORED DESENVOLVIMENTO TECNOLOGICO S.A., São Paulo (BR)

(*) Notice: Subject to any disclaimer, the term of this patent is extended or adjusted under 35 U.S.C. 154(b) by 445 days.

(21) Appl. No.: 18/272,613

(22) PCT Filed: Jan. 6, 2022

(86) PCT No.: PCT/BR2022/050004
§ 371 (c)(1),
(2) Date: Jul. 17, 2023

(87) PCT Pub. No.: WO2022/150894
PCT Pub. Date: Jul. 21, 2022

(65) Prior Publication Data

US 2025/0003683 A1 Jan. 2, 2025

(30) Foreign Application Priority Data

Jan. 15, 2021 (BR) ........................ 102021000742-7

(51) Int. Cl.
*F27D 3/00* (2006.01)

(52) U.S. Cl.
CPC .................................. *F27D 3/0032* (2013.01)

(58) Field of Classification Search
CPC ........ F27D 3/0032; F27D 3/0033; F27D 3/00; F27D 3/0025; F27D 3/10; C21B 5/001; C21B 7/20; F27B 1/20
(Continued)

(56) References Cited

U.S. PATENT DOCUMENTS 3,543,955 A * 12/1970 Shekels ..................... C21B 7/20 266/183
4,913,406 A * 4/1990 Fukushima ............. C21B 5/008 414/161

(Continued)

FOREIGN PATENT DOCUMENTS

BR 102015005373 10/2016
EP 3235912 10/2017

(Continued)

OTHER PUBLICATIONS

Relatorio de Pesquisa Internacional e Opinião Escrita [International Search Report and the Written Opinion] Dated Mar. 23, 2022 From the International Searching Authority Re. Application No. PCT/BR2022/050004 and Its Translation of Search Report Into English. (9 Pages).

(Continued)

*Primary Examiner* — Jessee R Roe
*Assistant Examiner* — Michael Aboagye
(74) *Attorney, Agent, or Firm* — LUCAS & MERCANTI, LLP

(57) ABSTRACT

The present invention is related to charge distribution systems in a metallurgical furnace. In this scenario, the present invention provides a load distribution system in a metallurgical furnace, comprising (i) an open silo (10) adapted to receive loads of different varieties, (ii) a closed silo (20)
(Continued)

adapted to transfer loads from the open silo (10) to a sealed environment of the metallurgical furnace, (iii) at least one upper sealed valve (22), positioned upstream of the closed silo (20), (iv) at least one valve lower seal (24), positioned downstream of the closed silo (20), (v) at least two process silos (30), each process silo (30) adapted to receive a certain variety of load coming from the closed silo (20) and (vi) at least one distribution element (40) adapted to distribute the different load varieties in the respective process silos (30). The present invention also provides a method associated with the system described above.

8 Claims, 5 Drawing Sheets

(58) Field of Classification Search
USPC .................................................. 266/184, 265
See application file for complete search history.

(56) References Cited

U.S. PATENT DOCUMENTS

| | | | | |
|---|---|---|---|---|
| 6,800,113 | B2 * | 10/2004 | Contrucci ................. | F27B 1/20 75/487 |
| 10,488,111 | B2 * | 11/2019 | Ferreira Filho ......... | C21B 11/02 |
| 11,142,803 | B2 * | 10/2021 | Pongiglione .............. | F27B 1/20 |
| 2018/0371559 | A1 | 12/2018 | Pongiglione et al. | |

FOREIGN PATENT DOCUMENTS

| | | | | |
|---|---|---|---|---|
| JP | 05-203368 | | 8/1993 | |
| WO | WO2006094370 | * | 9/2006 | ................ F27B 1/20 |

OTHER PUBLICATIONS

Examination Report Dated Aug. 26, 2024 From the Australian Government, IP Australia Re. Application No. 2022207887. (3 Pages).

* cited by examiner

SYSTEM AND METHOD FOR DISTRIBUTING LOADS IN A METAL FURNACE

RELATED APPLICATIONS

This application is a National Phase of PCT Patent Application No. PCT/BR2022/050004 having International filing date of Jan. 6, 2022, which claims the benefit of priority of Brazil Patent Application No. BR102021000742-7 filed on Jan. 15, 2021. The contents of the above applications are all incorporated by reference as if fully set forth herein in their entirety.

FIELD AND BACKGROUND OF THE INVENTION

The present invention is related to charge distribution systems in a metallurgical furnace.

Various load distribution systems in metallurgical furnaces are known in the state of the art. Among them, systems comprising distribution cones and distribution systems of the "coneless" type (bell-less) are known, the latter being used in the most modern metallurgical furnaces. Coneless type distribution systems normally comprise a movable rotating chute responsible for distributing the load at different points in the metallurgical furnace.

Document BR112013028519B1, for example, describes a coneless charging system for Blast Furnaces including two top hoppers, a first supply system that supplies charge to the top hoppers, and a distribution chute to which charges discharged from one of the top hoppers are conveyed through a collecting hopper and which loads the mixed charges into a blast furnace.

Type distribution systems without connected to self-employed metallurgical ovens, such as ovens described in documents BR102013033702B1, BRPI0208170B1, BRPI0208174B1, BR102015005373A2 and WO2019110748A1, usually comprising several subsystems, where each is responsible for supplying a certain region of the oven with a specific type of load. Below is a detailed description of a load distribution system applied to a self-reduction metallurgical furnace.

The state-of-the-art charging system for a self-reducing metallurgical furnace is equipped with silos, valves, ducts, and movable chutes for load distribution inside the furnace, as described in FIGS. 1 to 5. The load is distributed in different regions of the kiln, namely (i) the side feeder region, (ii) the central region, and (iii) the self-reduction region, each being equipped with a dedicated equipment subset.

As the self-reduction furnace is a gas-pressurized system, the subsystems are equipped with open silos to receive the load and closed silos for transfer. There are also sealing valves between the silos and between the closed silo and the furnace to seal the system.

When the open silo receives the load, the valves remain closed. The valve between silos opens so that the load is transferred to the closed silo, which has the same pressure as the atmosphere (absence of furnace gases). Before the charge is transferred to the furnace, the valve above the closed silo closes and the silo is pressurized with nitrogen until the pressure inside the silo is slightly higher than the pressure inside the reactor. With that, the valve between the closed silo and the kiln opens and the load is directed to the inside of the kiln.

Distribution chutes or chutes move in an angular manner (similar to a pendulum) distributing the load in the longitudinal direction of the kiln to distribute the self-reducing load. The central region is equipped with a load diverter system and three distribution ducts. The side fuel is discharged directly into the furnace, with a load-directing valve directing the load to one side.

The distribution chutes are inserted inside the reactor for realization, being exposed to temperatures ranging from 200 to 600° C. Motors and drive systems responsible for moving the chutes and valves are located outside but are still subjected to relatively high temperatures, ranging from 25 to 100° C. due to the emission of heat from the internal reactions of the reactor.

The state-of-the-art system is still composed of load level meters inside the furnace to identify which region of the furnace needs to be supplied. The charge level has to be kept constant for the best functioning of the reactor, measured in meters or millimeters. The load is entirely contained in the reactor, and pipes and ducts remain empty, that is, there is a maximum height to be controlled. Similar to the gutters and valves, part of the level gauges are also exposed to the internal atmosphere of the reactor under high temperatures.

However, state-of-the-art distribution systems, such as the one described in the example above, have a considerable height and low autonomy, since the latter depends directly on the height of the closed silos. Thus, the lower the height of the system as a whole, which is quite desirable, the lower the autonomy. Therefore, the current state of the art is unable to provide a compact system with good autonomy at the same time.

Additionally, in the case of expansion of the metallurgical furnace, as illustrated in FIGS. 4 and 5, the state-of-the-art distribution systems must be multiplied by the required supply quantity, significantly increasing the supply complexity and cost.

Finally, state-of-the-art load distribution systems generally comprise mobile equipment at the entrance or inside the metallurgical furnace, causing these components to suffer wear due to high temperatures.

The invention now proposed solves the problems of the state of the art described above in a simple and efficient way.

SUMMARY OF THE INVENTION

The present invention has as a first objective to provide a system and a method of load distribution in a metallurgical furnace that reduces the total height of the set by promoting a greater horizontality in the system.

The present invention has as a second objective to provide a system and a method of load distribution in a metallurgical furnace that significantly increases the furnace supply autonomy without implying an increase in the height of the system.

The present invention has as a third objective to provide a system and a method of load distribution in a metallurgical furnace that guarantees the cooling of the gases and preheating of the charge before entering the furnace, reducing the wear due to heating of the valves and other components of distribution.

In order to achieve the objectives described above, the present invention provides a load distribution system in a metallurgical furnace, comprising (i) an open silo adapted to receive loads of different varieties, (ii) a closed silo adapted to transfer the loads from the open silo to a sealed environment of the metallurgical furnace, (iii) at least one upper tight valve, positioned upstream of the closed silo, (iv) at least one lower tight valve, positioned downstream of the closed silo, (v) at least two process silos, each process silo adapted to receive a given load variety coming from the closed silo and (vi) at least one distributing element adapted to distribute the different load varieties in the respective process silos.

The present invention also provides a method of distributing loads in a metallurgical furnace, comprising the steps of (i) receiving, in an open silo, loads of different varieties, (ii) transferring the loads from the open silo to a sealed furnace environment metallurgist by passing them through a closed silo, at least one upper tight valve, positioned upstream of the closed silo, and at least one lower tight valve, positioned downstream of the closed silo, (iii) receive, in each of at least two process silos, a certain variety of load coming from the closed silo, and (iv) distributing the different load varieties in the respective process silos through at least one distributing element.

BRIEF DESCRIPTION OF THE SEVRAL VIEWS OF THE DRAWINGS

The detailed description presented below makes reference to the attached figures and their respective reference numbers.

DESCRIPTION OF SPECIFIC EMBODIMENTS OF THE INVENTION

Preliminarily, it is emphasized that the description that follows will start from a preferred embodiment of the invention. As will be apparent to anyone skilled in the art, however, the invention is not limited to that particular embodiment.

Figure 1:
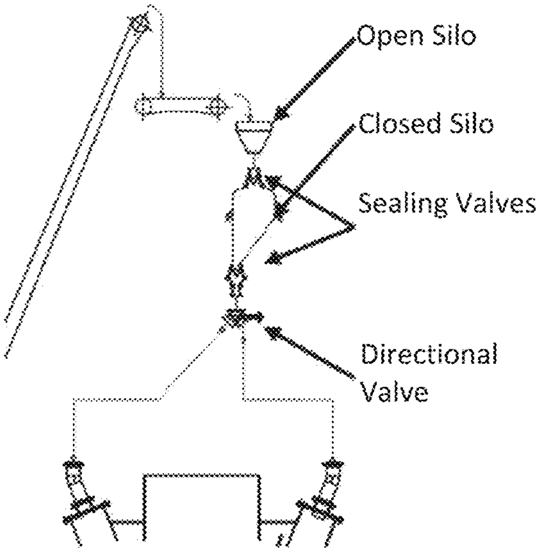
FIG. 1 illustrates a schematic sectional view of a lateral fuel distribution system for a self-reduction metallurgical furnace according to the prior art.
Figure 2:
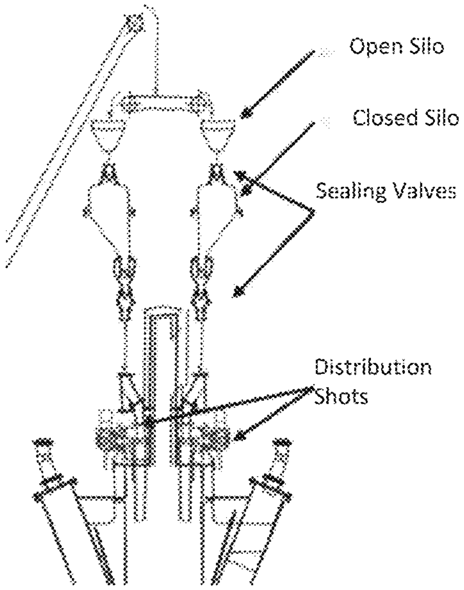
FIG. 2 illustrates a schematic cross-sectional view of a self-reducing charge distribution system for a self-reducing metallurgical furnace according to the prior art.
Figure 3:
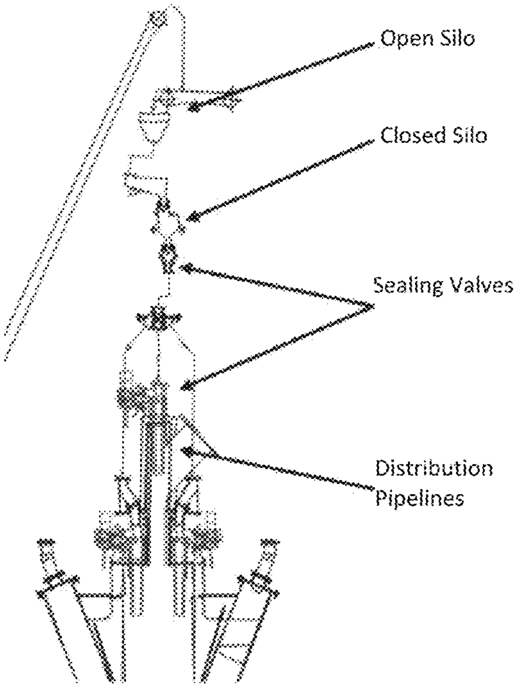
FIG. 3 illustrates a schematic sectional view of a central load distribution system for a metallurgical self-reduction furnace according to the state of the art.
Figure 4:
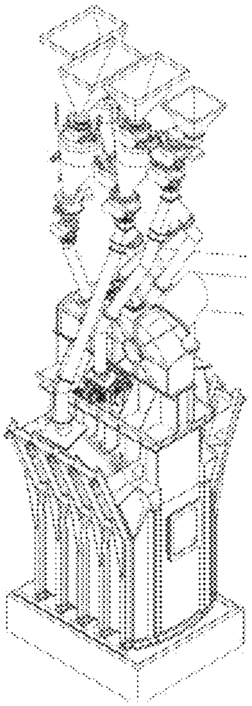
FIG. 4 illustrates a perspective view of the distribution systems of FIGS. 1 to 3 in a metallurgical self-reduction furnace according to the state of the art.
Figure 5:
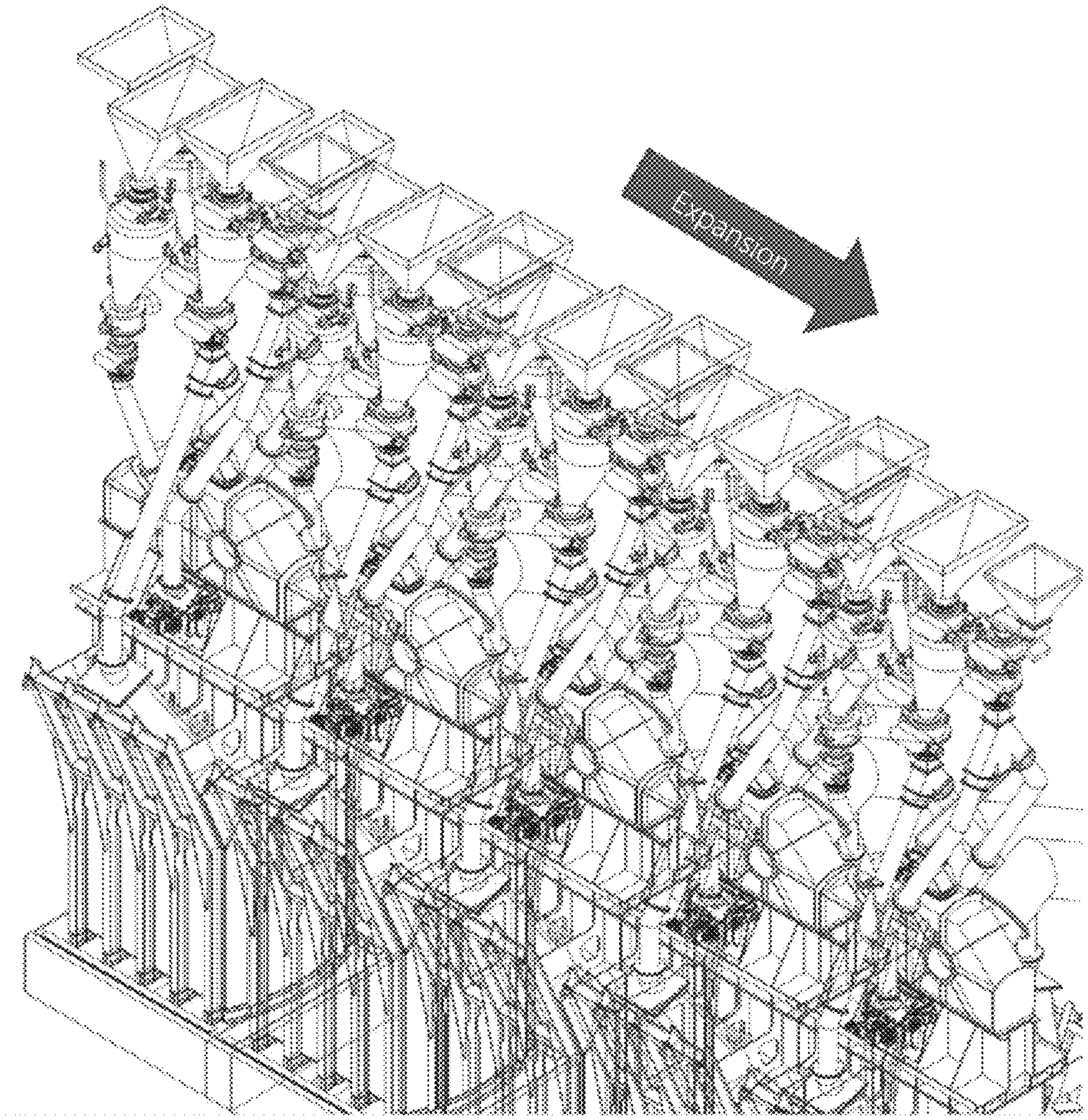
FIG. 5 illustrates a perspective view of the distribution systems of FIG. 4 in an expansion model of the self-reduction metallurgical furnace according to the state of the art.
Figure 6:
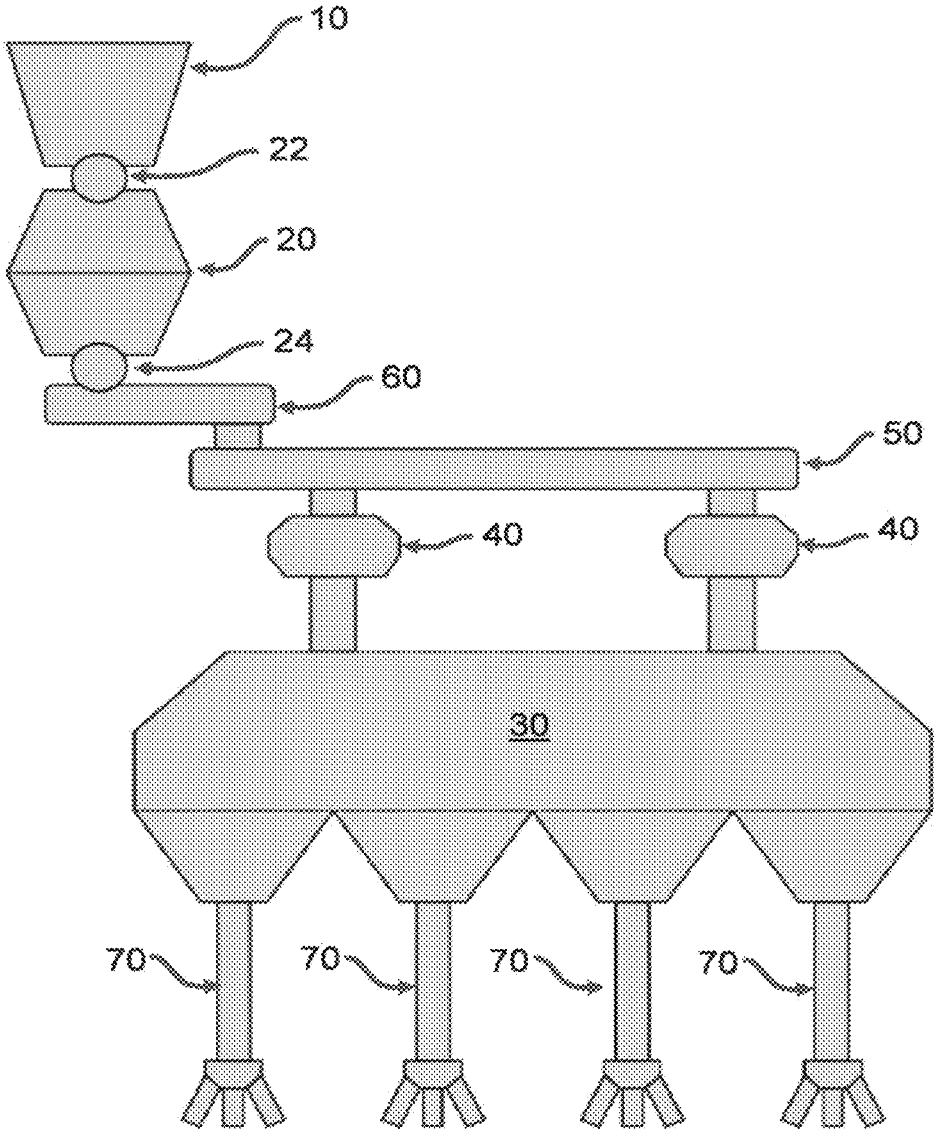
FIG. 6 illustrates a schematic side view of a fuel delivery system for a self-reduction metallurgical furnace in accordance with a preferred embodiment of the present invention.
Figure 7:
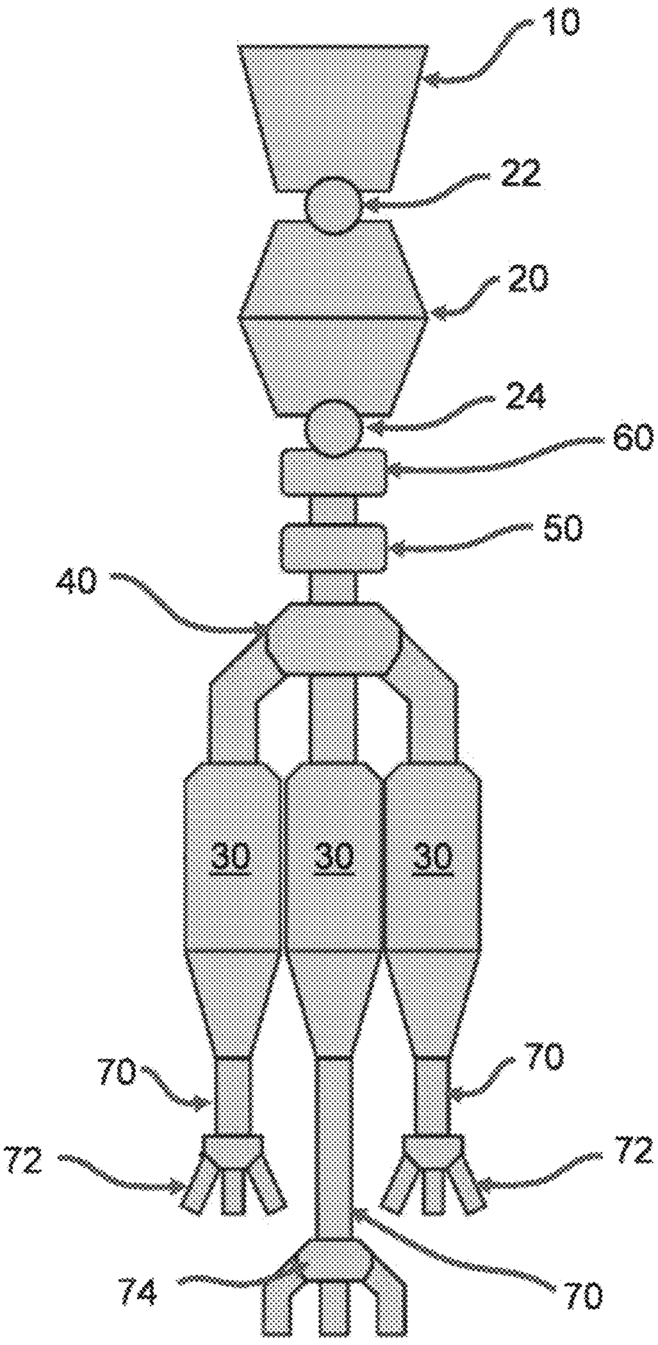
FIG. 7 illustrates a schematic front view of the distribution system in FIG. 6.

FIGS. 6 and 7 show, respectively, the schematic side and front views of the fuel distribution system for a metallurgical self-reduction furnace according to a preferred embodiment of the present invention. It is noteworthy, however, that the invention is not limited to this specific type of metallurgical furnace, and can also be applied in Blast Furnaces and other furnaces.

The system according to the preferred embodiment of the present invention will comprise, firstly, an open silo 10 adapted to receive loads of different varieties. In the example described here, where the present distribution system is applied in a self-reducing furnace, the different varieties of loads can be, for example, (i) solid fuel, (ii) self-reducing load and (iii) central load. Each of these cargo varieties must enter the system through the open silo 10 and be forwarded to a specific region of the distribution system and metallurgical furnace, as will be further detailed below.

The system of the present invention will further comprise a closed silo 20 adapted to transfer loads from the open silo 10 to a sealed environment of the metallurgical furnace. At least one upper tight valve 22 is positioned upstream of the closed silo 20. In the example of FIGS. 6 and 7, the upper tight valve 22 is positioned above the closed silo 20 and below the open silo 10. Additionally, at least one lower tight valve 24 is positioned downstream of the closed silo 20. In the example of FIGS. 6 and 7, the lower tight valve 24 is positioned immediately below the closed silo 20.

It is considered in the present description that the sealed environment of the metallurgical furnace encompasses all the elements of the system downstream of the lower sealed valve 24. That is, all elements of the system of the present invention that are downstream of the lower tight valve 24 have the same atmosphere of gases and pressure of the metallurgical furnace.

When the open silo 10 receives the load, the sealing valves 22, 24 remain closed. Then, the upper sealing valve 22 opens so that the load is transferred to the closed silo 20, which, at that moment, has the same pressure as the atmosphere (absence of furnace gases). Before the load is transferred to the sealed environment of the metallurgical furnace, the upper sealing valve 22 closes and the closed silo 20 is pressurized with gas from the sealed environment of the metallurgical furnace until the pressure inside the closed silo 20 is equal to or slightly higher than the internal pressure of the metallurgical furnace. With that, the lower tight valve 24 opens and the load is extracted from the closed 20.

Below the lower check valve 24, are positioned at least two process silos 30, each process silo being adapted to receive a certain variety of load coming from the closed silo 20. In the embodiment described here, where there are three varieties of loads (solid fuel, self-reducing load, and central load), three process silos 30 are provided, one for each type of load.

Since all varieties of cargo enter through the same place in the distribution system of the present invention, namely, through the open silo 10 passing subsequently through the tight valves 22, 24, and through the closed silo 20, at least one distributing element 40 is provided for distributing the different varieties of cargo in the respective process silos 30.

The distributor element can be, for example, a set of valves, controlled and driven by a control system (not shown), which direct the loads to their respective process silos 30. Optionally, the control system identifies, by techniques known from the state of the art, the type of load that enters the system of the present invention to correctly direct it to the respective process silo. More preferably, the control system additionally triggers and controls the supply system of the distributor system of the present invention in order to start and stop the supply of each type of load in the open silo 10 depending on the level of stock of each type of load in the silos of process 30.

Figure 8:
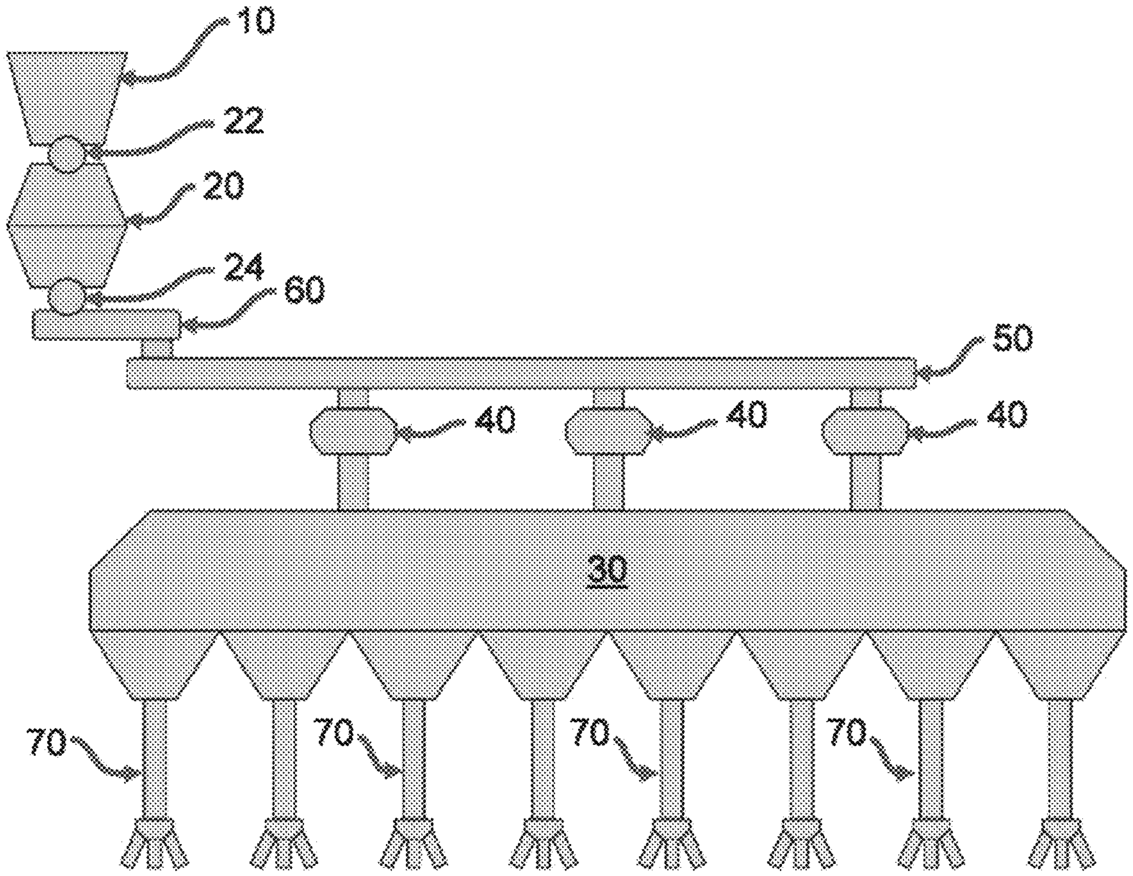
FIG. 8 illustrates a schematic side view of the distribution system of FIG. 6 in an expanded model.

Preferably, the system of the present invention further comprises at least one distribution belt 50 adapted to transport the load to each of the distribution elements 40. In a horizontally expanded model of the metallurgical furnace, the process silos 30 comprise a length proportional to the length of the expanded furnace (see FIG. 8, for example). In these cases, it may be interesting to use two or more distribution elements 40 supplied by the distribution belt 50. In this way, a distribution system is obtained with greater autonomy depending on the stock provided by the process silos 30—which are proportional to the length of the kiln—and with a reduced height when compared to state-of-the-art systems.

Optionally, the system of the present invention additionally comprises at least one extractor belt 60 adapted to transport the load from the closed silo 20 to the distribution belt 50.

Preferably, downstream of each process silo 30, distribution ducts 70 are provided adapted for communication between the process silos 30 and the metallurgical furnace. Preferably, at the lower end of each distribution duct 70, a charge diffuser 72 and/or a charge diverter system 74 is provided, depending on the type of charge to be supplied to the metallurgical furnace.

In the case of charge diffuser 72, there are no mechanical parts, and the charge is supplied directly and constantly to the furnace, that is, the furnace and pipes are always filled with material, maintaining a constant charge level. This type of mechanism is useful, for example, for the supply of solid fuel and self-reducing load, where it is important that the furnace is always full of these loads.

Regarding the load diverter 74, this can be, for example, a three-way load diverter similar to the currently used system, where mechanical elements (such as valves) are employed. Preferably, the control system activates and controls the load diverter 74 to supply the furnace with the load whenever necessary.

In the case of using the load spreader 72, for example, there are no distribution rails equipped with mechanical drive systems. Distribution ducts 70 and process silos 30 are completely filled with material, ensuring the cooling of gases in these regions and preheating of the load. Thus, the load absorbs heat from the furnace gases and prevents temperatures above 50° C. from reaching the valves located at the top. In addition, charge preheating improves furnace efficiency by avoiding large temperature gradients at the inlet of the metallurgical furnace.

Charge level gauges are optionally provided in the process silos 30. Thus, once these silos are full, it means that all the piping and regions of the furnace will be full. This eliminates, for example, the need for sensors inside the ovens, which end up being quite worn out due to the high working temperatures.

The present invention also provides a method of load distribution in a metallurgical furnace, comprising the steps of (a) receive, in the open silo 10, loads of different varieties;
(b) transfer the loads from the open silo 10 to a sealed environment of the metallurgical furnace by passing them through the closed silo 20, the upper tight valve 22, positioned upstream of the closed silo 20, and the lower tight valve 24, positioned downstream of the closed silo 20;
(c) receive, in each of the process silos 30, a certain variety of load coming from the closed silo 20; and
(d) distribute the different load varieties in the respective process silos 30 through one or more distributing elements 40.

Thus, as stated above, the present invention provides a system and method for distributing loads in a metallurgical furnace comprising the following technical advantages with respect to prior art systems and methods:

(i) reduction of the total height of the set by promoting greater horizontality in the system;
(ii) significant increase in furnace supply autonomy without implying an increase in system height;
(iii) guarantees the cooling of the gases and preheating of the charge before entering the furnace, reducing wear due to heating of the valves and other distribution components, in addition to reducing the temperature gradient between the furnace and the incoming charge;
(iv) possibility of expanding the system in a practical and low-cost way in case of expansion of the metallurgical furnace;
(v) single entry for different loads into the system through the open silo, simplifying the supply system.

Numerous variations affecting the scope of protection of this application are permitted. This reinforces the fact that the present invention is not limited to the particular configurations/embodiments described above.

The invention claimed is:

1. A method of charge distribution in a metallurgical furnace, comprising the steps of:
receiving, in an open silo (10), loads of different varieties;
transferring the loads from the open silo (10) to a sealed environment of the metallurgical furnace, passing them through a closed silo (20), at least one upper tight valve (22), positioned upstream of the closed silo (20), and through at least one lower tight valve (24), positioned downstream of the closed silo (20),
receiving, in at least two process silos (30), a different varieties of loads coming from the closed silo (20); and
distributing the different load varieties in the respective process silos (30) through at least one distributing element (40) and at least one distributing belt.

2. The method according to claim 1, further comprising the step of controlling, by means of a control system, the step of distributing the different load varieties in the respective process silos (30) through the at least one distributing element (40).

3. A load distribution system in a metallurgical furnace comprising: an open silo (10) adapted to receive loads of different varieties; a closed silo (20) adapted to transfer the loads from the open silo (10) to a sealed environment of the metallurgical furnace; at least one upper tight valve (22), positioned upstream of the closed silo (20); and at least one lower tight valve (24), positioned downstream of the closed silo (20), at least two process silos (30), each process silo (30) adapted to receive a given variety of load from the closed silo (20); and at least one distributing element (40) adapted to distribute the different load varieties in the respective process silos (30); and at least one distribution belt (50) adapted to transport the load varieties to the at least one distributing element (40).

4. The system according to claim 3, wherein the sealed environment of the metallurgical furnace encompasses all the elements of the system downstream of the lower tight valve (24).

5. The system according to claim 3, further comprising at least one extractor belt (60) adapted to transport the load from the closed silo (20) to at least one distribution belt (50).

6. The system according to claim 3, wherein the at least one distributing element (40) is two or more distributing elements positioned substantially at a same height, adapted to distribute the different load varieties at different points along a length of each process silo (30).

7. The system according to claim 3, further comprising at least one distribution duct (70) downstream of each process silo (30).

8. The system according to claim 7, further comprising at a lower end of the at least one distribution duct (70) at least one of:

a charge diffuser (72); and a load diverter system (74), and wherein the at least one distribution duct (70) and each process silos (30) are completely filled with material, preventing temperatures above 50° C. from reaching the at least one upper tight valve (22).

* * * * *